Oct. 11, 1927.
J. SLEPIAN
1,645,300
CURRENT LIMITING DEVICE
Filed July 19, 1920
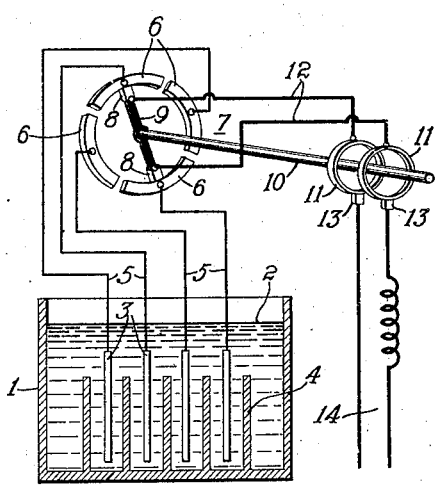
WITNESSES:
H. J. Shelhamer
F. H. Miller
INVENTOR
Joseph Slepian
BY
Wesley G. Carr
ATTORNEY Patented Oct. 11, 1927.

1,645,300

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

CURRENT-LIMITING DEVICE.

Application filed July 19, 1920. Serial No. 397,368.

My invention relates to current-limiting devices and particularly to electrolytic means for controlling the value of the current of an electric circuit.

One object of my invention is to provide a device of the above indicated character that shall comprise means having the inherent characteristic of changing its resistance when subjected to current flow.

Another object of my invention is to provide means for alternately connecting and disconnecting an automatically resistance-changing device in a circuit for limiting the current therein without the usual arcing accompanying the use of mechanically-operated devices.

In practicing my invention, I provide an electrolytic cell having a plurality of pairs of co-operating electrodes therein. Each electrode is connected to one member or segment of a commutator device with which a movable contact member co-operates to successively connect and disconnect the respective pairs of electrodes in series with a circuit and to alternately reverse the current in each pair each time it is connected in circuit. In operation, when the movable member passes from one pair of segments to another, a film is either partially or wholly formed or destroyed depending on its previous condition and the speed with which the movable member is actuated. In this manner, the current of a circuit may be variously limited.

The single figure of the accompanying drawing is a diagrammatic view of a current-limiting device embodying my invention.

A receptacle 1, containing a suitable electrolyte 2, such as a carbonate solution, is provided with film-forming electrodes 3, such as antimony, and nonfilm-forming electrodes 4 of good conducting material, such as copper, disposed between the electrodes 3 to equalize the resistance path from one to the other of the electrodes 3. By reason of the fact that electrodes 4 are electrically inter-connected, the resistance between any pair of the electrodes 3, whether they be adjacent to each other or separated by other electrodes 3, is the same. The electrodes 3 are grouped in pairs and connected by conductors 5 to oppositely related segments 6 of a commutator device 7. The latter comprises movable brushes 8 mounted on an insulating member 9 that is secured to a rotatable shaft 10. Slip rings 11, mounted on the shaft 10 and connected to the respective brushes 8 by conductors 12, also co-operate with stationary brushes 13 to alternately connect each pair of the electrodes 3 in series with a circuit 14, the current in which it is desired to limit or control.

During the rotation of the shaft 10 and at the instant that the brushes 8 occupy the positions shown in the drawings, current passes in one direction through the electrolyte 2 and through one pair of the electrodes 3. This flow of current, depending on the previous condition of the electrodes in circuit, causes either a film-forming action or a film-destroying action to occur. This action will be repeated as the brushes 8 pass on to the next pair of segments 6. At the end of a half revolution, the brushes 8 will again occupy the angular position shown in the drawings but with the current of the circuit 14 reversed through the previously connected electrodes. Thus the respective pairs of electrodes are successively connected and disconnected from the circuit and alternately reversed with respect thereto. By varying the speed of the shaft 10, the amount of film-forming and film-destroying action and, therefore, the amount of resistance change may be varied to give any desired current limiting characteristic.

While I have shown and described a particular form of my invention, changes may be effected therein without departing from the spirit and scope thereof, as set forth in the appended claims.

I claim as my invention:

1. The combination with an electrical circuit, of a current-limiting device therein comprising an electrolytic cell, a plurality of electrodes therein and means for periodically shifting the current from one electrode to another without changing the direction of the current in the circuit.

2. A current-limiting device comprising an electrolytic cell, a plurality of pairs of electrodes therein and means for periodically shifting the current from one pair to another of said electrodes.

3. A current-limiting device comprising an electrolyte, a plurality of film-forming electrodes therein, contact members connected to the electrodes, relatively movable contact members for engagement with said first contact members to so connect pairs of said electrodes in series with the circuit as to direct current between the electrodes of the respective pairs thereof alternately in each direction.

4. A current-limiting device comprising a container, an electrolyte and a plurality of film-forming electrodes therein, a stationary contact member connected to each of the electrodes, a rotatable member, slip rings on the rotatable member, brushes connected to a circuit and engaging the slip rings, and contact members disposed on the rotatable member and connected to the slip rings, said movable contact members engaging said stationary contact members to connect pairs of said electrodes in series with the circuit to direct current between the electrodes of each of said pairs thereof alternately in each direction.

In testimony whereof, I have hereunto subscribed my name this 13th day of July 1920.

JOSEPH SLEPIAN.